United States Patent [19]

Shoji et al.

[11] Patent Number: 4,824,069
[45] Date of Patent: Apr. 25, 1989

[54] MOLD ASSEMBLY FOR PRODUCING SKIN-COVERED FOAMED PLASTIC ARTICLE

[75] Inventors: Makoto Shoji; Yoshitoshi Oshikawa, both of Kanagawa, Japan

[73] Assignee: Ikeda Bussan Co., Ltd., Ayase, Japan

[21] Appl. No.: 212,793

[22] Filed: Jun. 29, 1988

[30] Foreign Application Priority Data

Aug. 28, 1987 [JP] Japan .......................... 62-131212[U]

[51] Int. Cl.⁴ ............................................. B29C 33/14
[52] U.S. Cl. ........................................ 249/91; 249/95; 249/96; 249/112; 249/187.1; 249/205; 264/46.4; 264/257; 264/278; 425/117; 425/DIG. 48
[58] Field of Search ................. 249/83, 91, 93, 95–97, 249/112, 160, 187.1, 205, 219.1; 425/112, 117, 127, 129.1, 397, 400, 403.1, DIG. 48, 817 R; 264/46.4, 46.6, 46.8, 257, 267, 275, 278, 316

[56] References Cited

U.S. PATENT DOCUMENTS 3,878,277  4/1975  Velte .................................. 264/46.4
4,501,541  2/1985  Bethell et al. ...................... 425/127

FOREIGN PATENT DOCUMENTS 2190621  11/1987  United Kingdom ............... 264/46.4

Primary Examiner—Jay H. Woo
Assistant Examiner—James C. Housel
Attorney, Agent, or Firm—Foley & Lardner, Schwartz, Jeffery, Schwaab, Mack, Blumenthal & Evans

[57] ABSTRACT

A mold assembly for producing a skin-covered foamed plastic article is disclosed, which includes a lower mold having a cavity formed therein, the lower mold having a first skirt portion which extends around a mouth of the lower mold; an upper mold which is to be put on the lower mold to close the cavity, the upper mold having a second skirt portion which is mated with the first skirt portion of the lower mold when these two molds are properly coupled; and a pair of holding plates which are detachably connected through fasteners to spaced portions of the lower mold, each holding plate including a first portion which is detachably connected to the first skirt portion and a second portion which extends over a given wall portion of the cavity of the lower mold, whereby when a bag-shaped outer skin member is properly set in the cavity, the holding plates press given portions of the outer skin member against the inner wall of the cavity.

8 Claims, 1 Drawing Sheet

MOLD ASSEMBLY FOR PRODUCING SKIN-COVERED FOAMED PLASTIC ARTICLE

BACKGROUND OF THE INVENTION

1. Field of the Invention

The present invention relates in general to a mold assembly for producing a foamed plastic article, and more particularly to a mold assembly for producing a skin-covered foamed plastic article, such as a skin-covered pad for a seat cushion and/or a seatback of a seat.

2. Description of the Prior Art

Hitherto, in the field of manufacturing the skin-covered foamed plastic articles, a method has been widely employed which generally comprises by steps placing a bag-shaped outer skin member in a mold, pouring a liquid material of foamed plastic into the outer skin member in the mold, and curing the material and removing a product, viz., a skin-covered foamed plastic article, from the mold upon the product being hardened to a sufficient level. However, it has been difficult or at least troublesome to properly and stably set the outer skin member in a right position of the mold. In fact, during curing of the material of the foamed plastic in the mold, the outer skin member is applied with a notable pressure due to vigorous foaming of the material, so that it tends to occur that the outer skin member is displaced from the right position. This causes deterioration in quality of the products.

One of the methods hitherto employed for eliminating the above-mentioned drawback is to use a double-sided adhesive tape for assuring the stable positioning of the outer skin member relative to the mold during the curing of the material. That is, the outer skin member is attached to the cavity wall of the mold with an interposal of the adhesive tape therebetween.

However, using the adhesive tape has caused the products to be soiled considerably due to the adhesive remained thereon. In addition, due to the nature of the adhesive tape, the outer skin member has been forced to produce unsightly creases thereon. Furthermore, it has occured that the products are somewhat damaged when the tape is peeled or removed from the products.

SUMMARY OF THE INVENTION

It is therefore an object of the present invention to provide a mold assembly for producing a skin-covered foamed plastic article, which is free of the above-mentioned drawback.

According to the present invention, there is provided a mold assembly for producing a skin-covered foamed plastic article. The mold assembly comprises a lower mold having a cavity formed therein, the lower mold having a first skirt portion which extends around a mouth of the lower mold; an upper mold which is to be put on the lower mold to close the cavity, the upper mold having a second skirt portion which is mated with the first skirt portion of the lower mold when these two molds are properly coupled; and a holding plate which is detachably connected to a given portion of the lower mold, the holding plate including a first portion which is detachably connected to the first skirt portion and a second portion which extends over a given wall portion of the cavity of the lower mold, whereby when a bag-shaped outer skin member is properly set in the cavity, the holding plate presses a given portion of the outer skin member against the inner wall of the cavity.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, the present invention will be described in detail with reference to the drawings.

Figure 1:
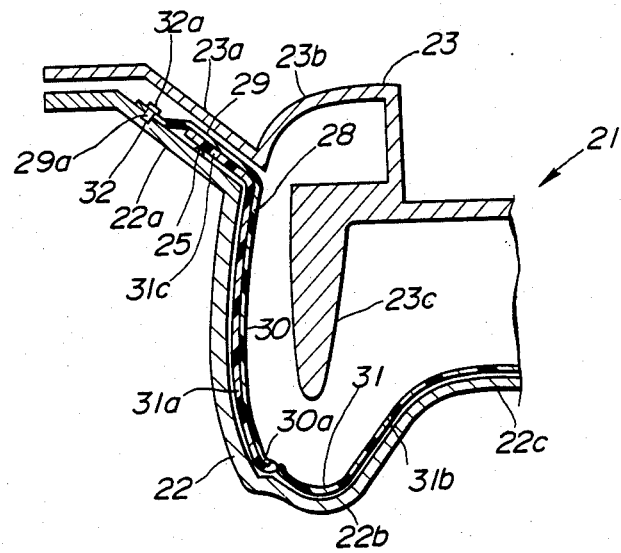
FIG. 1 is a partial sectional view of a mold assembly according to the present invention, with a bag-shaped outer skin member properly set in the mold assembly.
Figure 2:
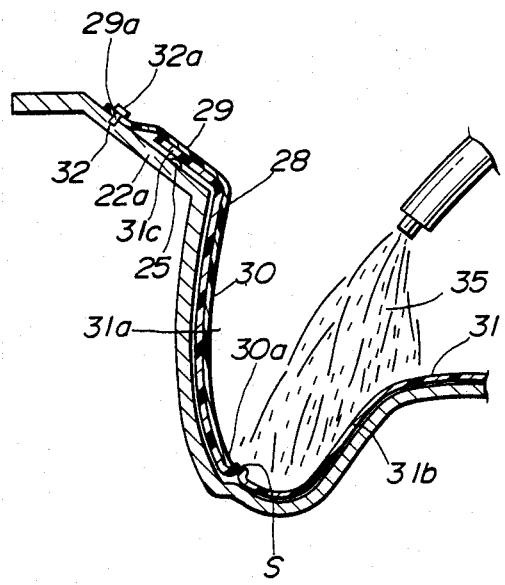
FIG. 2 is a partial sectional view of the mold assembly showing that a liquid material of foamed plastic is being poured into the bag-shaped outer skin member in a lower mold.

Referring to FIGS. 1 and 2, there is shown a mold assembly 21 according to the present invention.

The mold assembly 21 comprises a lower mold 22 and an upper mold 23 which is to be put on the lower mold 22. The lower mold 22 comprises laterally spaced two deeper rounded portions 22b (only one is shown) and a shallower intermediate portion 22c arranged between the deeper rounded portions 22b. The upper mold 23 comprises a lid portion 23b and laterally spaced two inward projections 23c (only one is shown). Thus, as is understood from FIG. 1, upon coupling of these two molds 22 and 23, the projections 23c of the upper mold 23 project into a cavity defined by these two molds 22 and 23.

As is seen from FIG. 1, the lower and upper molds 22 and 23 are formed with respective skirt portions 22a and 23a which are mated when the two molds 22 and 23 are properly coupled.

A holding plate 28 of plastic is detachably connected to each side wall of the cavity of the lower mold 22. That is, as is shown in FIG. 2, the holding plate 28 comprises an upper bent portion 29 which is detachably connected through an after-mentioned fastening device to the skirt portion 22a of the lower mold 22, and a smoothly curved major portion 30 which extends over the corresponding side wall of the cavity of the lower mold 22. As shown, the major portion 30 of the holding plate 28 has a shape corresponding to that of the side wall of the cavity. For the purpose which will become apparent hereinafter, the top portion of each upper bent portion 29 is formed with slots 29a which are aligned along the longitudinal axis of the upper bent portion 29. The plastic for the holding plate 28 is selected from a group which exhibits a high releasing property against the material of foamed plastic which is used. If desired, the holding plate 28 may be constructed of a metal plate coated with a suitable plastic layer.

The fastening device comprises a plurality of bolts 32 fixed to the skirt portion 22a of the lower mold 22, each bolt 32 having a rotatable head 32a which is sized to match with the slot 29a of the holding plate 28. That is, upon requirement of fastening of the holding plate 28, the upper bent portion 29 of the holding plate 28 is put on the skirt portion 22a of the lower mold 22 having the headed bolts 32 of the lower mold 22 passed through the corresponding slots 29a of the holding plate 30. Then, the heads 32a of the bolts 32 are turned by a suitable degree to press the upper bent portion 29 against the skirt portion 22a. If desired, the fastening device may comprise headed screws which are to be screwed into threaded bores formed in the skirt portion 22a.

Below the fastening device, there are provided a plurality of aligned pins 25 which are arranged on the skirt portion 22a of the lower mold 22.

In the following, the steps for producing the skin-covered foamed plastic article 40 (see FIG. 3) will be described. It is to be noted that prior to these production steps, the holding plates 28 are kept removed from the lower mold 22.

First, a bag-shaped outer skin member 31 is prepared. The skin member 31 is shaped to match with the shape of the cavity of the lower mold 22 and comprises generally three parts 31a, 31b and 31a which are stitched to one another to constitute a bag-shaped structure. Each part comprises an outer skin layer and a wadding lined on a back surface of the outer skin layer.

The bag-shaped outer skin member 31 is put into the cavity of the lower mold 22 having its upper peripheral portion 31c seated on the skirt portion 22a of the lower mold 22. Under this condition, the peripheral portion 31c does not move due to provision of the pins 25 which stick in the peripheral portion 31c. Then, the holding plates 30 are fixed to the lower mold 22 in such a manner as has been described hereinabove. Then, the lower edge 30a of each holding plate 30 is handled to catch a corresponding stitched portion of the outer skin member 31, as is seen from FIG. 2. With this, each side part 31a of the outer skin member 31 is stretched by the corresponding holding plate 30 having the upper peripheral portion 31c thereof stationarily held between the pin portions 25 and the upper bent portion 29 of the holding plate 28. That is to say, the outer skin member 31 is stably held in the lower mold 22.

Then, a liquid material 35 for foamed plastic, such as polyurethane foam or the like, is poured into the bag-shaped outer skin member 31 in the mold 22 and thereafter, the upper mold 23 is put on the lower mold 22 to close the cavity. Thus, thereafter, the urethane material is forced to cure in the enclosed space defined by the two molds 22 and 23.

Figure 3:
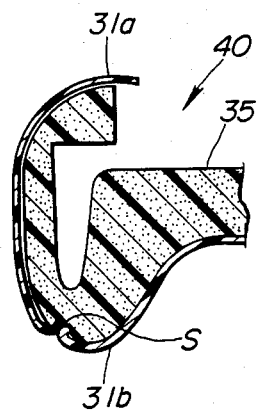
FIG. 3 is a partial sectional view of a product, viz., a skin-covered foamed plastic article, which is produced via the mold assembly of the present invention.

After the urethane material is hardened to a sufficient level, the upper mold 23 is removed from the lower mold 22, and then, the rotatable heads 32a of the bolts 32 are turned to permit disengagement of the holding plates 30 from the lower old 22. Then, a product, viz., a skin-covered foamed polyurethane article 40 is removed from the lower mold 22 together with the holding plates 30. Then, the holding plates 30 are removed from the product. With these steps, the skin-covered foamed urethane article 40 as shown in FIG. 3 is produced.

Obviously, many modifications and variations of the present invention are possible in light of the above teachings. It is to be understood therefore that within the scope of the appended claims, the present invention may be practiced otherwise than as specifically described herein.

What is claimed is:

1. A mold assembly for producing a skin-covered foamed plastic article, comprising:

a lower mold having a cavity formed therein, said lower mold having a first skirt portion which extends around a mouth of said lower mold;

an upper mold which is to be put on said lower mold to close said cavity, said upper mold having a second skirt portion which is mated with said first skirt portion of said lower mold when these two molds are properly coupled; and a holding plate which is detachably connected through fastening means to the first skirt portion of said lower mold, the holding plate including a first portion which is detachably connected to said first skirt portion and a second portion which extends over an inner wall portion of the cavity of the lower mold, whereby when a bag-shaped outer skin member is properly set in the cavity, said holding plate presses a given portion of said outer skin member against the inner wall of said cavity.

2. A mold assembly for producing a skin-covered foamed plastic article, comprising:

a lower mold having a cavity formed therein, said lower mold having a first skirt portion which extends around a mouth of said lower mold;

an upper mold which is to be put on said lower mold to close said cavity, said upper mold having a second skirt portion which is mated with said first skirt portion of said lower mold when these two molds are properly coupled; and a pair of holding plates which are detachably connected through fastening means to spaced portions of said lower mold, each holding plate including a first portion which is detachably connected to said first skirt portion and a second portion which extends over, an inner wall portion of the cavity of the lower mold, whereby when a bag-shaped outer skin member is properly set in the cavity, said holding plates press given portions of said outer skin member against the inner wall of said cavity.

3. A mold assembly as claimed in claim 2, in which each of said holding plates, is provided with means at its leading end to catch an inwardly projected stitched portion of the outer skin.

4. A mold assembly as claimed in claim 2, in which each of said holding plates is constructed of a plastic.

5. A mold assembly as claimed in claim 2, in which each of said holding plates is constructed of a metal plate which is coated with a plastic layer.

6. A old assembly as claimed in claim 4, in which said fastening means comprises a plurality of bolts secured to said first skirt portion, and head members rotatably connected to said bolts.

7. A mold assembly as claimed in claim 6, further comprising a plurality of pin members which are arranged on said first skirt portion at a position between said fastener means and said cavity, so that upon the outer skin member being held in the cavity of the lower mold, an upper portion of the outer skin member is pressed against said pin members by the holding plate.

8. A mold assembly as claimed in claim 7, in which said upper mold comprises a lid portion and two laterally spaced inward projections, whereby upon coupling of the lower and upper molds, the projections of the upper mold project into the enclosed cavity defined by said molds.

* * * * *